May 14, 1963  J. J. STAMM  3,089,991
CONTROL OF SERIES MOTORS
Filed April 22, 1960  3 Sheets-Sheet 1

Fig. I.

WITNESSES:
Wm. L. Groome
James F. Young

INVENTOR
John J. Stamm.
BY
Paul E. Friedemann
ATTORNEY

May 14, 1963

J. J. STAMM 3,089,991

CONTROL OF SERIES MOTORS

Filed April 22, 1960

May 14, 1963   J. J. STAMM   3,089,991
CONTROL OF SERIES MOTORS
Filed April 22, 1960   3 Sheets-Sheet 3

United States Patent Office 3,089,991
Patented May 14, 1963

3,089,991
CONTROL OF SERIES MOTORS
John J. Stamm, Franklin Township, Westmoreland County, Pa., assignor to Westinghouse Electric Corporation, East Pittsburgh, Pa., a corporation of Pennsylvania
Filed Apr. 22, 1960, Ser. No. 24,043
5 Claims. (Cl. 318—144)

This invention relates to an electric system of control and more particularly to a system of control of a generator and motor combination wherein the motor used is a series motor.

While this invention finds use in traction and hoisting applications, the particular application made is in connection with oil well drilling rigs.

Until recently, the control utilized on oil well drilling rigs required a differential exciter, a main generator and a main separately excited motor. Such a system is both expensive and cumbersome, involving special generator design and considerable design experimentation and testing.

For use in traction application, hoisting applications and in the oil industry the series motor has found a wide field of use. The series motor has distinct advantages over a separately excited motor, such as increased torque at stall speed, a wider speed range for a given minimum voltage, elimination of separate excitation and the associated power losses at light or no load.

The series motor, however, has one characteristic which precludes its application to quite a few jobs. This disadvantageous characteristic is its tendency to increase its speed when the load is reduced up to the point where serious damage to the motor and the connected machinery is very likely to occur.

While this tendency to "run away" can be checked by the use of suitable rectifiers placed in parallel with the series motor field winding, the possibility of maintaining the motor speed within certain limits regardless of the range of changes in load still did not exist.

One broad object of this invention is the provision of a system of control for a generator and motor combination where a series motor is used and the speed variations of the motor due to load changes on the motor are held within relatively narrow desirable limits.

Another object of this invention is to so match the volt-ampere curve characteristic of a generator with respect to a series motor that the series motor will operate at substantially constant speed from no-load to full load for any selected volt output of the generator.

These objects stated are merely representative of the broad objects of this invention. Other broad objects of this invention and particularly the specific objects will become more apparent from a study of the subject matter to follow.

This invention includes a static excitation and control system which eliminates the need of a separate rotating exciter, its belt drive and mounting and permits a flexibility not possible with the differential exciter system used heretofore. Further, this invention provides close speed control, so essential to satisfactory performance in oil well drilling, at a lower initial cost and with a definite assurance of lower maintenance cost and increased reliability.

Further, this invention eliminates the separate motor excitation since a series motor is used. The system of control is such that the series motor gives higher maximum stall torque, reduces the duty cycle on both motor and generator in comparison to a separately excited motor and results in an overall saving in first cost and operating expense.

The new system of control is designed to give a somewhat drooping series motor characteristic beyond the continuous rating, and a shunt or constant speed performance between zero load and full load. Also, to improve the stability of the series motor at low speed, a small amount of rectified D.C. is supplied to the motor series field winding.

Still other objects and advantages will become more apparent from a study of the following specification and the accompanying drawings, in which.

Figure 1:
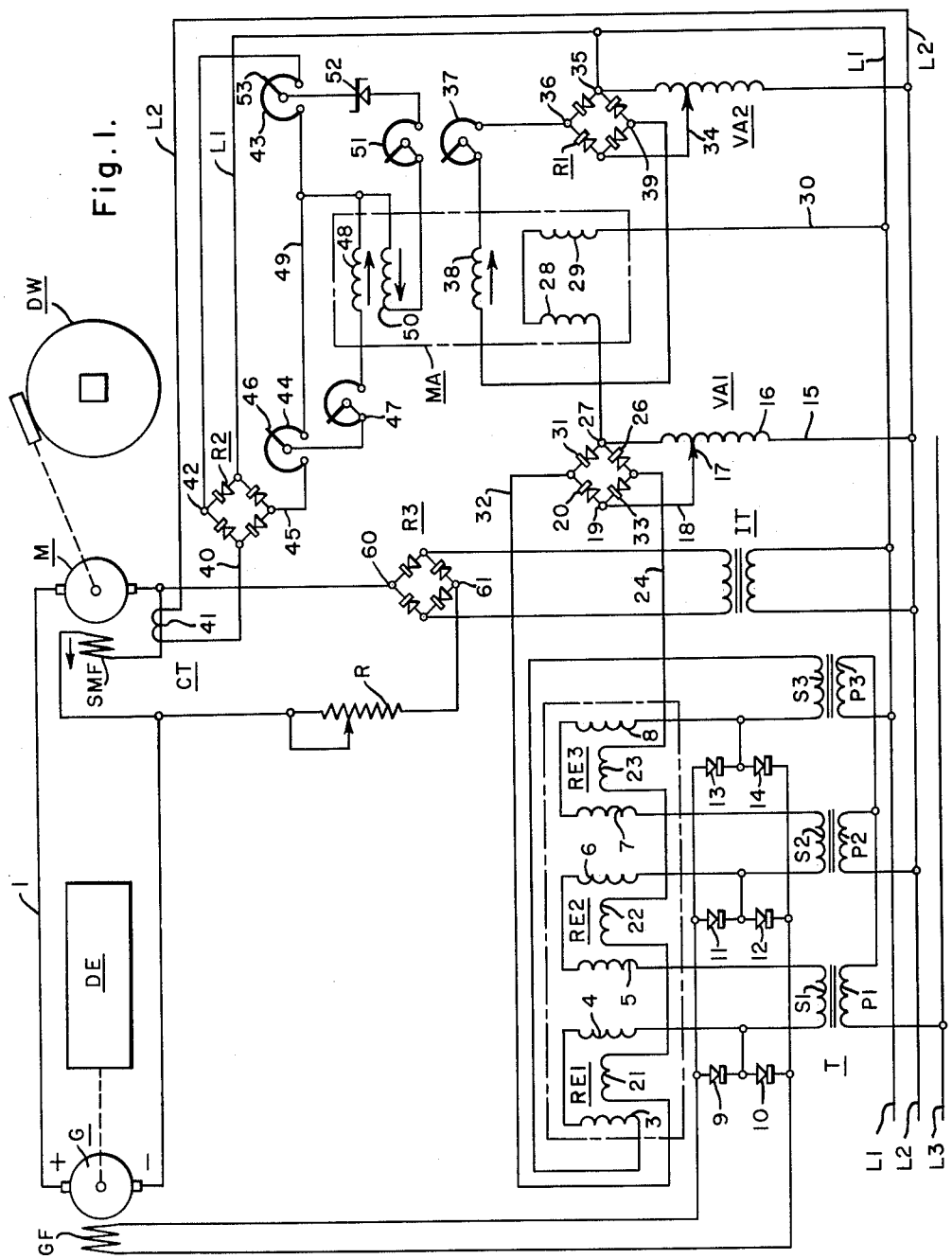
FIGURE 1 is a diagrammatic showing of this invention as applied to an oil well drilling rig.

In the arrangement shown in FIG. 1, DE represents a diesel engine coupled to drive the generator G. This generator G is connected in a loop circuit with the motor M. This loop circuit may be traced from the positive terminal of the generator G through conductor 1, the motor M, the series field winding SMF and conductor 2 to the negative terminal of the generator G. The motor is coupled to drive the draw works DW, or to drive the hoisting equipment of the drilling rig.

To obtain the desired volt ampere characteristics for the generator, a saturable reactor type of control system has been worked out which produces the desired generator characteristics.

The power for the generator field winding GF is supplied from the three-phase 60 cycle, 440–480 volt A.C. supply leads L1, L2 and L3. The 440 volt supply is stepped down by the transformer T having the primary windings P1, P2 and P3 connected to the leads L1, L2 and L3 as shown. The secondary windings S1, S2 and S3 are interconnected as shown with the main windings 3 and 4, 5 and 6, 7 and 8 of the respective reactors RE1, RE2 and RE3. The output of the main windings is rectified by the rectifiers 9 and 10, 11 and 12, and 13 and 14 and supplied to the generator field winding GF. The characteristics of the excitation supplied to the generator will, of course, govern the type of volt ampere characteristics the generator will have.

The saturable core reactors RE1, RE2 and RE3 are controlled from a single magnetic amplifier unit MA. The total magnetic amplifier output is made a function of the following signal inputs fed into the various control windings of the magnetic amplifier:

(1) Main Current. This signal is supplied to a control winding either from a shunt, generator interpole, or a transducer.
(2) Torque. This signal is fed from the source mentioned under signal 1, to another control winding but so connected to act in opposition to the current ampere turns, with the ampere turns in this torque control winding properly selected and its windings being biased for near zero output up to 960 amperes by a suitable diode.
(3) Signal Control Winding. In order to compensate for residual generator flux a small amount of negative ampere turns are maintained in this signal control winding.

Figure 4:
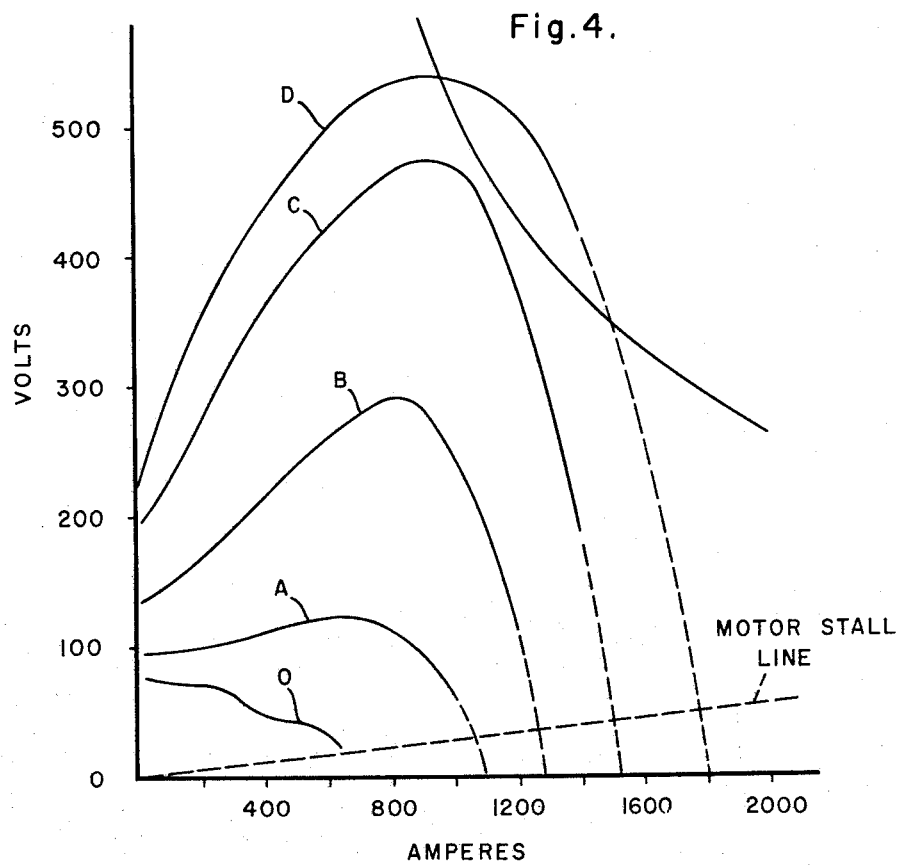

The volt ampere characteristics developed by the type of control broadly just mentioned is shown in FIG. 4. The curves marked A, B, C, and D are power notches arbitrarily established for the purpose of comparison. The data given by the full line portion of the curves are obtained by actual tests of existing equipment. The portions of the curves shown in broken lines were calculated since the available power supply for the particular existing equipment was not adequate to extend the tests to that region.

It will be noted from FIG. 4 that the generator has volt ampere characteristics that rise, at a decreasing rate, from an initial low voltage value at no load current to a maximum value determined by the continuous current rating of the generator. From the maximum the curves each show a steep decline at an increasing negative rate to a point where the curve intersects the stall line of the motor. The no load point determines the no load speed of the motor, and the maximum volts, at continuous rating, represents maximum generator output.

To an artist the curves in FIG. 4, particularly curves C and D, may be likened to the general shape of the contour of a haycock, leaning somewhat to the right, as seen from some distance, projected against the landscape background.

The reactors RE1, RE2, and RE3 have the control windings 21, 22, and 23, respectively. The input to these control windings is governed by the output of the main windings 28 and 29 of the magnetic amplifier MA. The circuits for the control windings may be traced, when lead L2 is positive, from lead L2 through conductor 15, a portion 16 of the variac, VA1, to junction, or tap 17, conductor 18, junction 19, rectifier 20, conductor 32, control windings 21, 22 and 23, conductor 24, rectifier 26, junction 27, main windings 28 and 29, and conductor 30 to lead L1. When lead L1 is positive, the circuit may be traced from lead L1, through conductor 30, main windings 29 and 28, junction 27, rectifier 31, conductor 32, control windings 21, 22 and 23, conductor 24, rectifier 33, conductor 18, tap 17, a portion 16 of the variac and conductor 15 to load L2.

It will be noted that for one-half cycle tap 17 is positive and junction 27 negative and for the other half cycle junction 27 is positive and tap 17 is negative. The voltage across tap 17 and junction 27 determines whether the volt ampere curve is A, B, C, or D or any other intermediate value depending on the position of tap 17.

Another variac VA2 is connected across leads L1 and L2. The output of this variac, at its direct current terminals, is determined by the position of tap 34 on the variac. An alternating current voltage of a selected value is thus supplied between tap 34 and terminal 35, and a selected control current is thus supplied from positive terminal 36, through the rheostat 37, pattern, or signal, winding 38, to the negative terminal 39. Let the magnetic effect of winding 38 be as indicated by the arrow adjacent this winding.

A full-wave rectifier R2 is interconnected with leads L1 and L2 as follows, lead L1, rectifier R2, conductor 40, the secondary winding 41 of current transformer CT to lead L2. Since the current transformer CT measures the load current flowing in the motor generator loop, it is apparent that the voltage at the direct current terminals 42 and 45 is a measure of the load on motor M. The terminals 42 and 45 are connected in a loop circuit with the potentiometers 43 and 44.

This invention is not limited to a current transformer to provide a suitable source for control signals. Any means as a transducer, shunt, or generator interpole, may be used as the control signal source means.

A circuit for the control winding providing a signal proportional to the main motor load current is established from the adjustable tap 46 on potentiometer 44, through the rheostat 47, control winding 48, to the conductor 49 joining the potentiometers 43 and 44. By suitable adjustment of the rheostat 47 the load current control signal current in coil 48 can be made any selected value of the actual load current in the motor-generator loop circuit. From the arrow adjacent this winding, it is apparent that effect of winding 48 is additive to the effect of winding 38.

The control winding 50 providing a signal as a function of torque is connected from conductor 49, through torque control winding 50, rheostat 51, Zener diode 52, to tap 53. The magnetic effect of winding 50 is differential with respect to the effect of winding 48. Further, the Zener diode does not break down before the flow of a load current of 960 amperes. Coil or winding 50 is thus biased for zero output up to 960 amperes.

The curves A, B, C and D, shown in FIG. 4, show an initial or residual voltage of a given value. This residual voltage at zero load is the result of the pattern winding and a relatively small direct current stabilizing voltage applied to the motor series field winding and also across the current transformer CT.

This separate direct current voltage is relatively small to the voltage drop across the motor series field winding during normal full load of the motor. This separate direct current source includes means, as the rectifier R3, to block reverse current flow.

The initial voltage, considering curve C, is 200 volts at no load and then rises like the rising portion of a sine wave, somewhat distorted to be sure, to a maximum of 475 volts at full load of the motor, or full rating of the generator and then drops off smoothly and rather rapidly to substantially zero volts at a load current of 1525 amperes, the stall speed of the motor.

Figure 3:
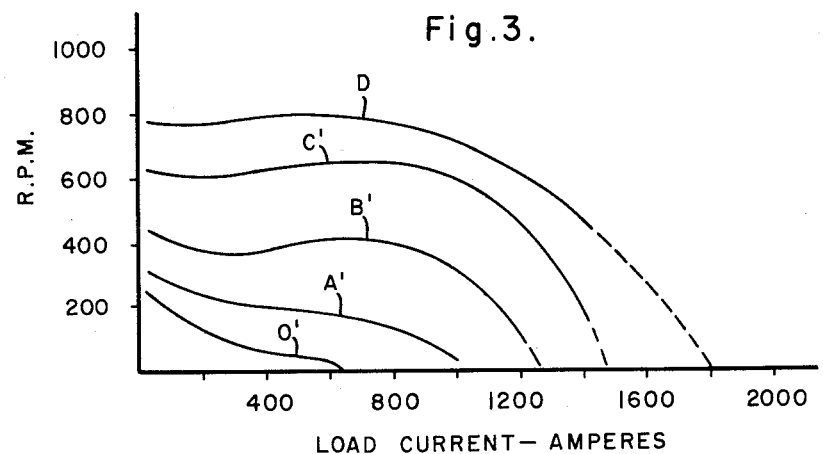
FIGS. 3 and 4 are curves illustrating the operating characteristics of certain components of this invention.

This kind of volt-ampere characteristic produces, in a matched series motor connected in a loop circuit with a generator having such a characteristic, a speed-load current characteristic as shown by curve C' in FIG. 3. It will be noted that the motor speed remains substantially constant, at 600 r.p.m. up to full load of the motor and then drops off to a stall speed at 1525 amperes.

Curves O', A', B', C' and D' correspond to the volt-ampere curves O, A, B, C, and D.

The curves shown in FIG. 3 thus show the motor speed in relation to motor amperes of a series motor connected to the generator. While the curves show that the motor speed in the range from zero to 900 amperes is not perfectly constant, the speed values that are obtained are well within acceptable limits. By suitable further modifications of the ampere turns of the various windings, further improvement of the generator volt ampere curve, and the consequent more nearly constant motor speed characteristics, may be obtained.

In the range of 900 to 2000 load amperes, the motor will gradually slow down and stall at the intersection of the IR drop line, or motor stall line, with the generator volt-ampere curve. This desirable characteristic will permit large stall torques to be developed and gives smooth, rapid and shock-free acceleration, of heavy loads.

When dynamic breaking is desired, as in the drawwork motor control, a small low voltage full-wave rectifier R3 and adjustable resistor R is provided. The rectifier R3 is, through an isolation transformer IT that provides the proper voltage, connected to leads L1 and L2. It will be noted that the positive terminal 60 is connected to the right terminal of the motor series field winding SMF and the negative terminal 61, through adjustable resistor R is connected to the left terminal of the motor series field winding SMF.

This rectifier R3 will thus provide sufficient field excitation at low armature currents to ensure stability at no torque. It will also provide sufficient excitation to convert the motor into a generator whenever the generator excitation is lowered and the motor is running at a higher speed. Furthermore, the current flowing through the motor series field winding at no load, or very low armature current, will keep the motor sufficiently warm to prevent condensation and thus eliminates the need of a special heater. The rectifier load is small, being only 5% of the field loss at continuous rating.

Figure 2:
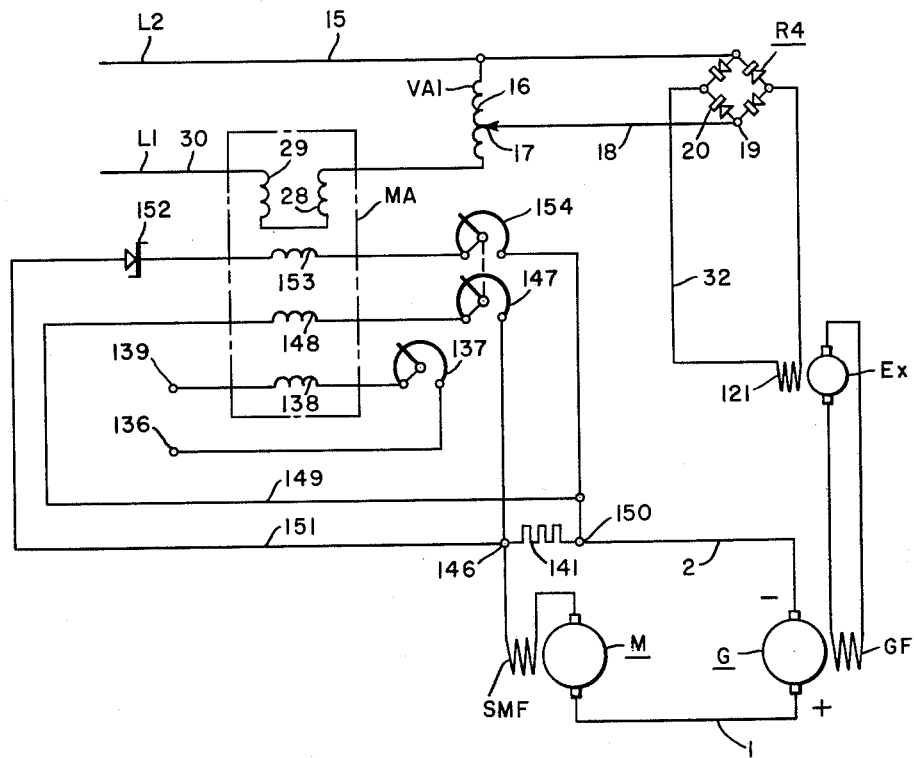
FIG. 2 is a diagrammatic showing of a modification of this invention.

While the embodiment shown in FIG. 1 is the preferred system of control, much the same result can be obtained where the generator field winding GF is excited from a rotating exciter Ex as shown in FIG. 2.

In this showing of FIG. 2, the motor M and generator G are connected in the loop circuit shown. A low resistance resistor 141 is connected in the loop circuit. This resistor 141 is selected to provide sufficient voltage drop to energize the control windings 148 and 153 of the magnetic amplifier MA.

The pattern winding 138 is energized by the circuit from positive terminal 136 through rheostat 137, pattern control winding 138 to the negative conductor 139. The control winding 148, providing the load current signal, is energized by the circuit from junction 146, through rheostat 147, control winding 148, conductor 149 to junction 150. The torque signal is provided by control winding 153. The circuit for this winding may be traced from junction 146, conductor 151, Zener diode 152, control winding 153, and rheostat 154 to the junction 150.

The main windings 28 and 29 are thus controlled in their energization as a function of the effects of the mentioned control windings. The circuit for the main windings may be traced from L2, through conductor 15, the variac VA1, windings 28 and 29, conductor 30 to lead L1. The portion 16 of the variac provides the input to the full-wave rectifier R4 whose output is supplied to the field winding 121 of the exciter Ex, and the output of the exciter is supplied to the generator field winding GF.

While this invention has been disclosed as applied to a particular environment, and with a certain degree of particularity, it is to be understood that all equivalents, modifications, and alterations and fields of use within the spirit and scope of this invention are meant to be included.

I claim:

1. In an electric system of control, in combination, a direct current generator having an armature winding and a field winding, a direct current motor of the series type having an armature winding and a field winding connected in series with the motor armature winding, a loop circuit including the generator armature winding, the motor armature winding, and the motor series field winding, control means responsive to an electric condition in the loop circuit, said control means having an output circuit, said output circuit including a pair of potentiometers connected, through a common terminal between them, in series with each other in the output circuit to thus have a voltage drop across the potentiometers that is a function of the electrical condition in the loop circuit, each of said potentiometers having an independently adjustable tap, a magnetic amplifier having main windings and three control windings, a Zener diode, and adjustable resistor and one of the control windings all connected in series across the independently adjustable taps, an adjustable resistor and a second of the control windings connected in series across one independently adjustable tap and the common terminal between the potentiometers, and adjustable resistor, and the third of said control windings connected in series to a suitable adjustable voltage supply of direct current, excitation means having output circuit means connected to the field winding of the generator and having control circuit means for controlling the current output of the output circuit means, said control circuit means being interconnected with the main windings of the magnetic amplifier means, the characteristics and adjustments of the circuitry including the control windings being such that the generator has a voltage output that varies with respect to load current from a selected relatively low value to a relatively high value and then back down to a lower value as current values of full load and above are approached, whereby the motor speed remains nearly constant from no-load to full-load.

2. In a system of control, in combination, a direct current generator driven by a suitable prime mover and having an armature winding and a separately excitable field winding, a direct current motor having an armature winding and a series field winding, with said generator armature winding, said motor armature winding and said motor series field winding being connected in a loop circuit, control signal source means having an output circuit and being associated with said loop circuit for producing in said output circuit an output signal as a function of the load current in said loop circuit, first control means interconnected with the output circuit of said control signal source means and responsive to said output signal for producing first electrical control signals that continuously vary in accordance with a selected fractional part of the load current in the loop circuit, second control means interconnected with said output circuit and responsive to said output signal for producing second electrical control signals in accordance with said output signal, after said output signal reaches a predetermined value mixing circuitry for said first and second electrical control signals to provide motor control signals, and generator field winding excitation means controlled by said motor control signals to provide excitation for the generator field winding such that the generator has a predetermined volt-ampere characteristic, whereby the series motor connected in the loop circuit with the generator will have substantially constant speed from no load to full load and beyond full load will have a drooping speed characteristic to a stall condition at a certain overload.

3. In a system of control, in combination, a direct current generator driven by a suitable prime mover and having an armature winding and a separately excitable field winding, a direct current motor having an armature winding and a series field winding, with said generator armature winding, said motor armature winding and said motor series field winding being connected in a loop circuit, control signal source means having an output circuit and being associated with the loop circuit for producing in its output circuit an output as a function of the load current in said loop circuit, first control means interconnected with the output circuit of said control signal source means for producing first electrical control signals that continuously vary in accordance with a selected fractional part of the load current in the loop circuit, second control means interconnected with said output circuit and responsive to said output signal for producing second electrical control signals in accordance with said output signal, after said output signal reaches a predetermined value a reference electrical control signal source for providing reference third control signals, mixing circuitry for said first and second and third control signals to provide output control signals, and generator field winding excitation means controlled by the latter output control signals to provide excitation for the generator field winding such that the generator has predetermined volt-ampere characteristics, whereby the series motor connected in the loop circuit with the generator will have substantially constant speed from no load to full load and beyond full load have a drooping speed characteristic to a stall condition at a certain overload.

4. In a system of control, in combination, a direct current generator having an armature winding and a separately excitable field winding, a direct current motor having an armature winding and a series field winding, with said generator armature winding, said motor armature winding and said motor series field winding being connected in a loop circuit, control signal source means having an output circuit and being associated with the loop circuit for producing in its output circuit an output as a function of the load current in said loop circuit, means interconnected with the output circuit of said control signal source means for producing electrical operation control signals that continuously vary in accordance with a selected fractional part of the load current in the loop circuit, a reference electrical control signal source for providing reference control signals, mixing circuitry for said operation control signals and said reference control signals to provide output control signals, with said mixing circuitry being responsive to said reference control signals in opposition to said operation control signals and generator field winding excitation means controlled by the latter output control signals to provide excitation for the generator field winding such that the generator has predetermined volt-ampere characteristics, whereby the series motor connected in the loop circuit with the generator will have substantially constant speed from no load to full load and beyond full load have a drooping speed characteristic to a stall condition at a certain overload, a separate source of direct current excitation connected across the motor series field winding with the same polarity as the series field winding, the voltage of said separate source being less than the voltage across the series field winding when the motor current exceeds a predetermined value.

5. In a system of control, in combination, a direct current generator having an armature winding and a separately excitable field winding, a direct current motor having an armature winding and a series field winding, with said generator armature winding, said motor armature winding and said motor series field winding being connected in a loop circuit, control signal source means having an output circuit and being associated with the loop circuit for producing in said output circuit an output signal as a function of the load current in said loop circuit, first control means interconnected with the output circuit of said control signal source means for producing first electrical control signals that continuously vary in accordance with a selected fractional part of the load current in the loop circuit, second control means interconnected with said output circuit and responsive to said output signal for producing second electrical control signals in accordance with said output signal, after said output signal reaches a predetermined value mixing circuitry for said first and second electrical control signals to provide output control signals, and generator field winding excitation means controlled by the latter output control signals to provide excitation for the generator field winding such that the generator has preselected volt-ampere characteristics whereby the series motor connected in the loop circuit with the generator will have substantially constant speed from no load to full load and beyond full load have a drooping speed characteristic to a stall condition at a certain overload, a separate source of direct current excitation connected across the motor series field winding with the same polarity as the series field winding, said separate source including means to block reverse current flow.

References Cited in the file of this patent

UNITED STATES PATENTS

| | | |
|---|---|---|
| 1,323,272 | Hellmund et al. | Dec. 2, 1919 |
| 2,627,597 | Johansson | Feb. 3, 1953 |
| 2,773,229 | Hunt et al. | Dec. 4, 1956 |
| 2,962,644 | Johnson | Nov. 29, 1960 |

FOREIGN PATENTS

| | | |
|---|---|---|
| 731,809 | Great Britain | June 15, 1955 |